United States Patent
Kanekawa et al.

(10) Patent No.: US 9,917,538 B2
(45) Date of Patent: Mar. 13, 2018

(54) MOTOR DRIVING CIRCUIT, MOTOR DRIVING SYSTEM, ELECTRIC POWER STEERING SYSTEM, ELECTRIC BRAKE SYSTEM, AND VEHICLE DRIVING SYSTEM

(71) Applicant: Hitachi Automotive Systems, Ltd., Hitachinaka-shi, Ibaraki (JP)

(72) Inventors: Nobuyasu Kanekawa, Tokyo (JP); Ryoichi Kobayashi, Hitachinaka (JP); Tomonobu Koseki, Hitachinaka (JP); Tomishige Yatsugi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 81 days.

(21) Appl. No.: 14/422,387

(22) PCT Filed: Jul. 12, 2013

(86) PCT No.: PCT/JP2013/069093
§ 371 (c)(1),
(2) Date: Feb. 19, 2015

(87) PCT Pub. No.: WO2014/030459
PCT Pub. Date: Feb. 27, 2014

(65) Prior Publication Data
US 2015/0214872 A1    Jul. 30, 2015

(30) Foreign Application Priority Data
Aug. 24, 2012  (JP) .................................. 2012-185546

(51) Int. Cl.
*H02P 1/04*     (2006.01)
*H02P 6/12*     (2006.01)
(Continued)

(52) U.S. Cl.
CPC ................ *H02P 6/12* (2013.01); *B60L 15/04* (2013.01); *B60T 13/74* (2013.01); *B62D 5/0463* (2013.01);
(Continued)

(58) Field of Classification Search
CPC . H02P 27/06; H02P 6/08; H02P 23/22; B62D 5/04; B62D 6/00; B62D 119/00;
(Continued)

(56) References Cited

U.S. PATENT DOCUMENTS 5,341,075 A * 8/1994 Cocconi .............. B60L 11/1811
307/66
8,310,219 B2 * 11/2012 Kuroyabu ............. H02M 3/156
323/271
(Continued)

FOREIGN PATENT DOCUMENTS

JP    2005-341740 A    12/2005
JP    2011-51481 A     3/2011
(Continued)

OTHER PUBLICATIONS

International Search Report (PCT/ISA/210) dated Sep. 17, 2013, with English translation (four (4) pages).

*Primary Examiner* — Bickey Dhakal
(74) *Attorney, Agent, or Firm* — Crowell & Moring LLP

(57) ABSTRACT

In order to provide a motor driving circuit in which a portion corresponding to a failed phase can be separated while miniaturization and lower costs are achieved, a motor driving circuit for driving a motor includes: a second driver circuit for driving a driver circuit which supplies a drive current corresponding to one phase of a multiphase motor having three or more phases, to the multiphase motor; and an electrical circuit which includes a plurality of electrical components and switches a connecting relation between the (Continued)

electrical components according to an operation mode designated from outside the motor driving circuit, thereby providing a circuit function corresponding to the operation mode.

10 Claims, 18 Drawing Sheets

(51) Int. Cl.
    *B62D 5/04*         (2006.01)
    *F16D 65/18*       (2006.01)
    *B60L 15/04*       (2006.01)
    *B60T 13/74*       (2006.01)
    *H02P 6/08*         (2016.01)
    *H02P 29/032*     (2016.01)
    *H02M 1/08*        (2006.01)
    *H02M 7/5387*     (2007.01)
    *H02P 27/06*       (2006.01)
    *H02M 1/00*        (2006.01)

(52) U.S. Cl.
    CPC ......... *B62D 5/0484* (2013.01); *B62D 5/0487* (2013.01); *F16D 65/18* (2013.01); *H02M 1/08* (2013.01); *H02M 7/5387* (2013.01); *H02P 6/085* (2013.01); *H02P 29/032* (2016.02); *H02M 2001/0045* (2013.01); *H02P 27/06* (2013.01); *Y02T 10/645* (2013.01)

(58) Field of Classification Search
    CPC ............... H03K 17/00; H03K 17/695; H02M 2001/0045
    USPC ...................................................... 318/400.17
    See application file for complete search history.

(56) References Cited

U.S. PATENT DOCUMENTS

| | | | |
|---|---|---|---|
| 8,963,479 B2* | 2/2015 | Suzuki | H02P 27/085 318/599 |
| 2006/0028188 A1* | 2/2006 | Hartular | H02M 3/156 323/273 |
| 2007/0069703 A1* | 3/2007 | Kokubun | H02M 3/1588 323/282 |
| 2010/0125384 A1* | 5/2010 | Wyatt | B60K 7/0007 701/22 |
| 2012/0145472 A1 | 6/2012 | Imamura et al. | |

FOREIGN PATENT DOCUMENTS

| | | |
|---|---|---|
| JP | 2011-120381 A | 6/2011 |
| JP | 2012-157154 A | 8/2012 |
| WO | WO 2012/102113 A1 | 8/2012 |

\* cited by examiner

[FIG. 1]
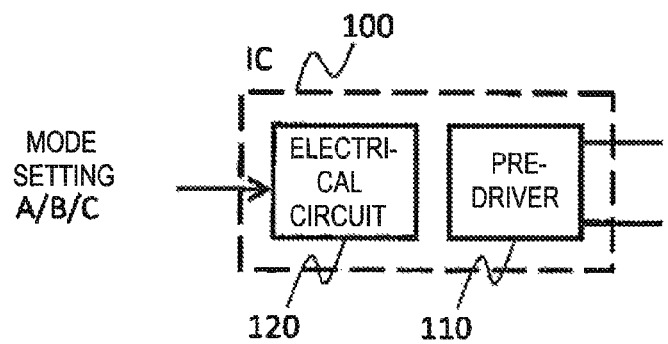
[FIG. 2]
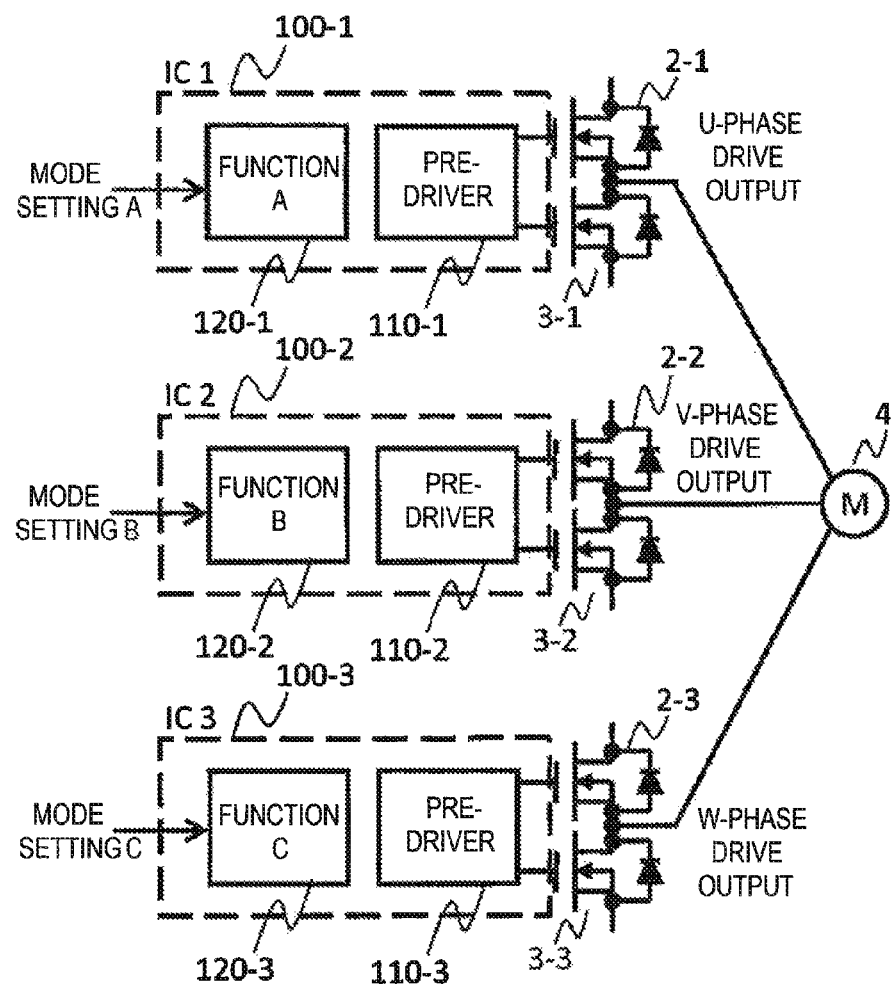

[FIG. 3]
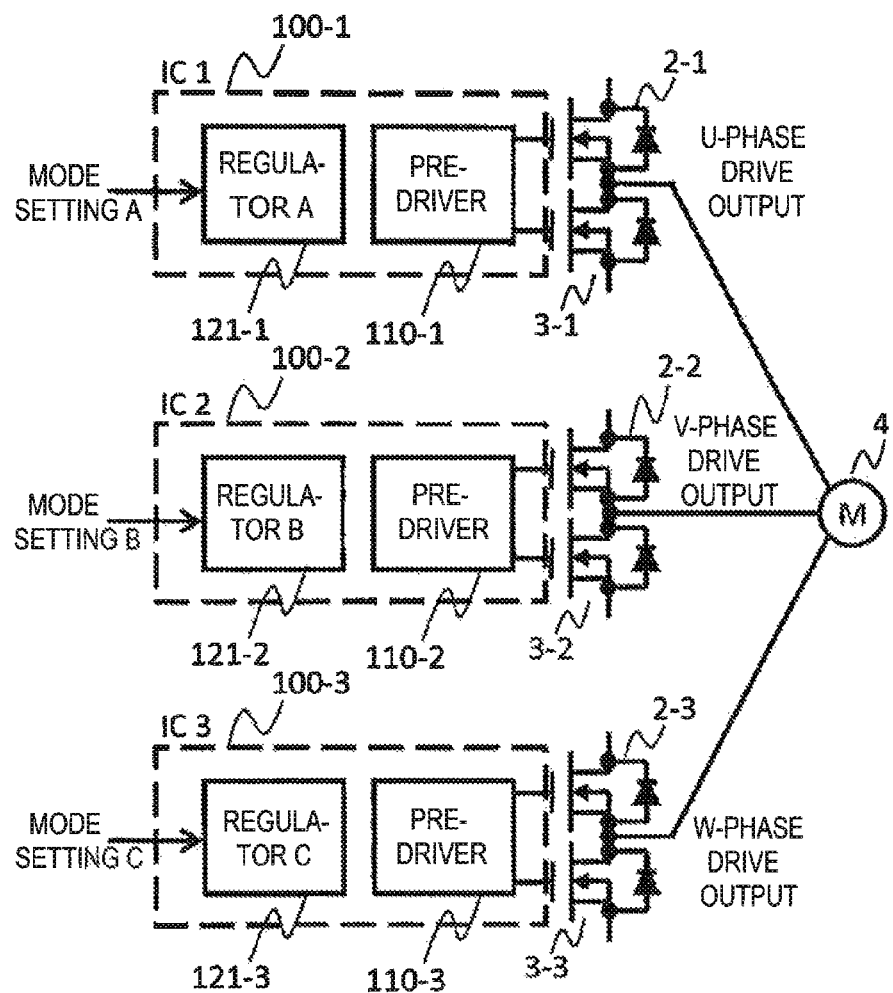

[FIG. 4]
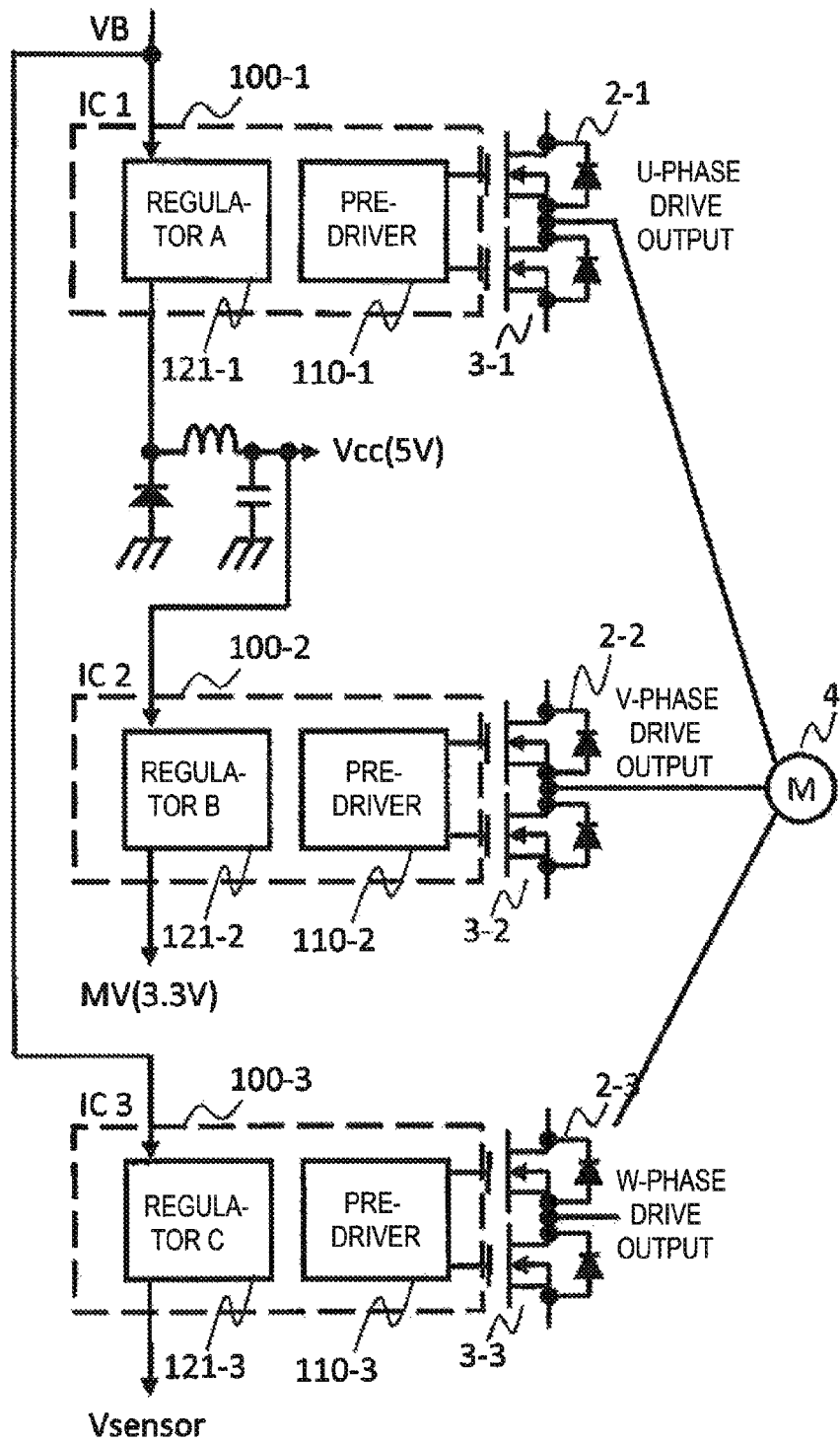

[FIG. 5]
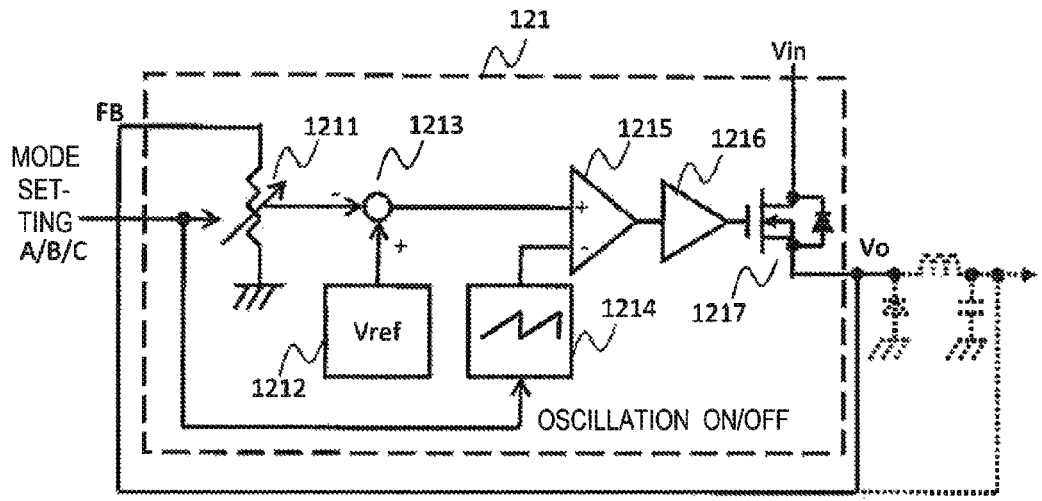
[FIG. 6]
| MODE | VOLTAGE-DIVIDING RESISTOR 1211 | OSCILLATOR 1214 | FUNCTION |
|---|---|---|---|
| A | Vref/5 | OSCILLATION ON | 5 V SWITCHING REGULATOR |
| B | Vref/3.3 | OSCILLATION OFF | 3.3 V LINEAR REGULATOR |
| C | Vref/Vsensor | OSCILLATION OFF | SENSOR POWER SOURCE |
[FIG. 7]
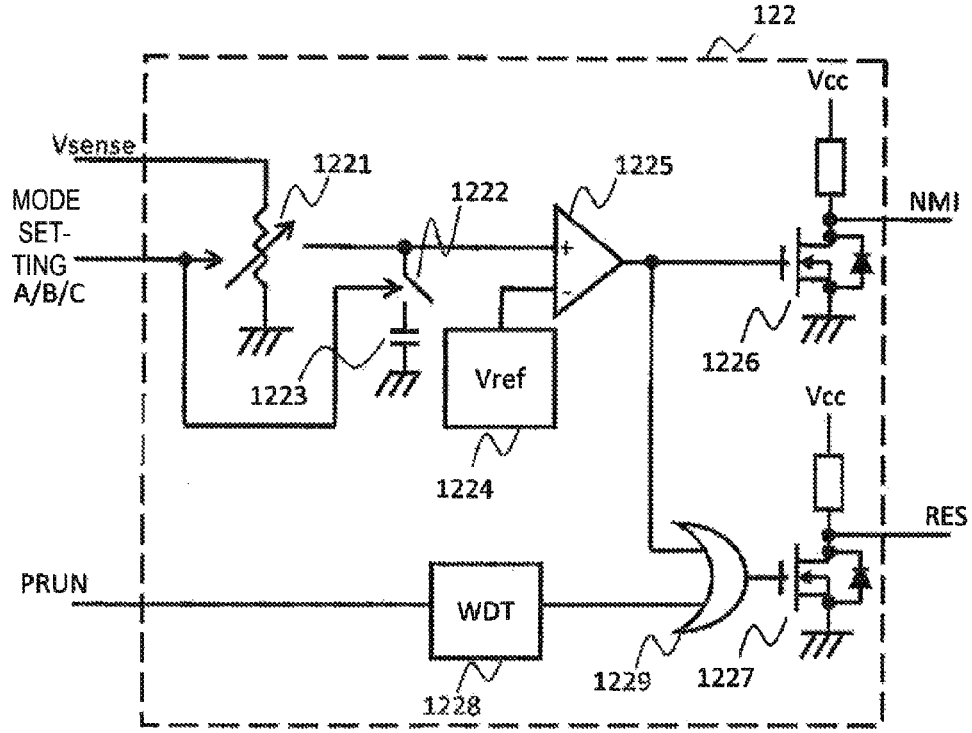

[FIG. 8]
| MODE | VOLTAGE-DIVIDING RESISTOR 1221 | SWITCH 1222 | FUNCTION |
|---|---|---|---|
| A | Vref/4.5 | ON | POWER-ON RESET |
| B | Vref/4.5 | ON/OFF | 5 V-TYPE VOLTAGE DROP RESET |
| C | Vref/3.0 | OFF | 3.3 V-TYPE VOLTAGE DROP RESET |
[FIG. 9]
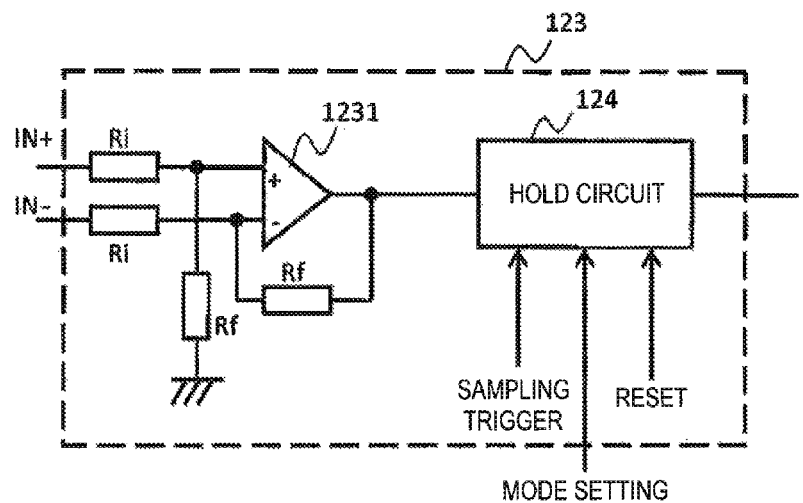
[FIG. 10]
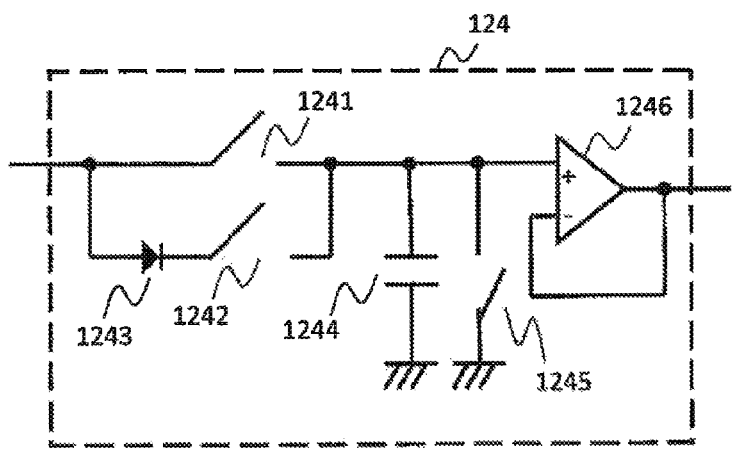

[FIG. 11]
| MODE | RESET | SAMPLING TRIGGER | SWITCH 1241 | SWITCH 1242 | SWITCH 1245 | FUNCTION |
|---|---|---|---|---|---|---|
| A | * | ON | ON | OFF | OFF | SAMPLE AND HOLD (RESOLVER SIGNAL) |
| A | * | OFF | OFF | OFF | OFF | |
| B | * | ON | ON | OFF | OFF | |
| B | * | OFF | OFF | OFF | OFF | |
| C | ON | * | OFF | OFF | ON | PEAK HOLD (TOTAL CURRENT DETECTION) |
| C | OFF | * | OFF | ON | OFF | |
[FIG. 12]
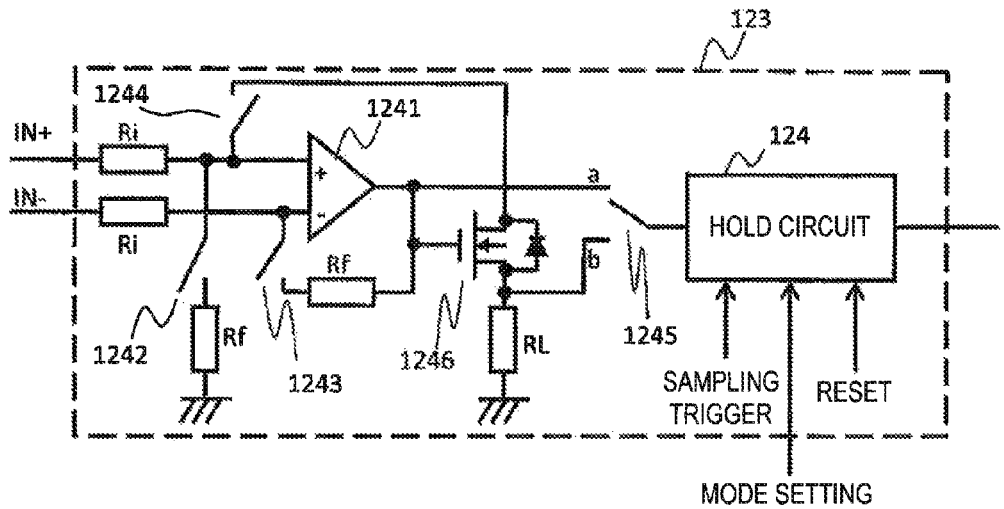
[FIG. 13]
| MODE | SWITCH 1242, 1243 | SWITCH 1244 | SWITCH 1245 | FUNCTION |
|---|---|---|---|---|
| A | ON | OFF | a | RESOLVER SIGNAL |
| B | ON | OFF | a | |
| C | OFF | ON | b | TOTAL CURRENT DETECTION |

[FIG. 14]
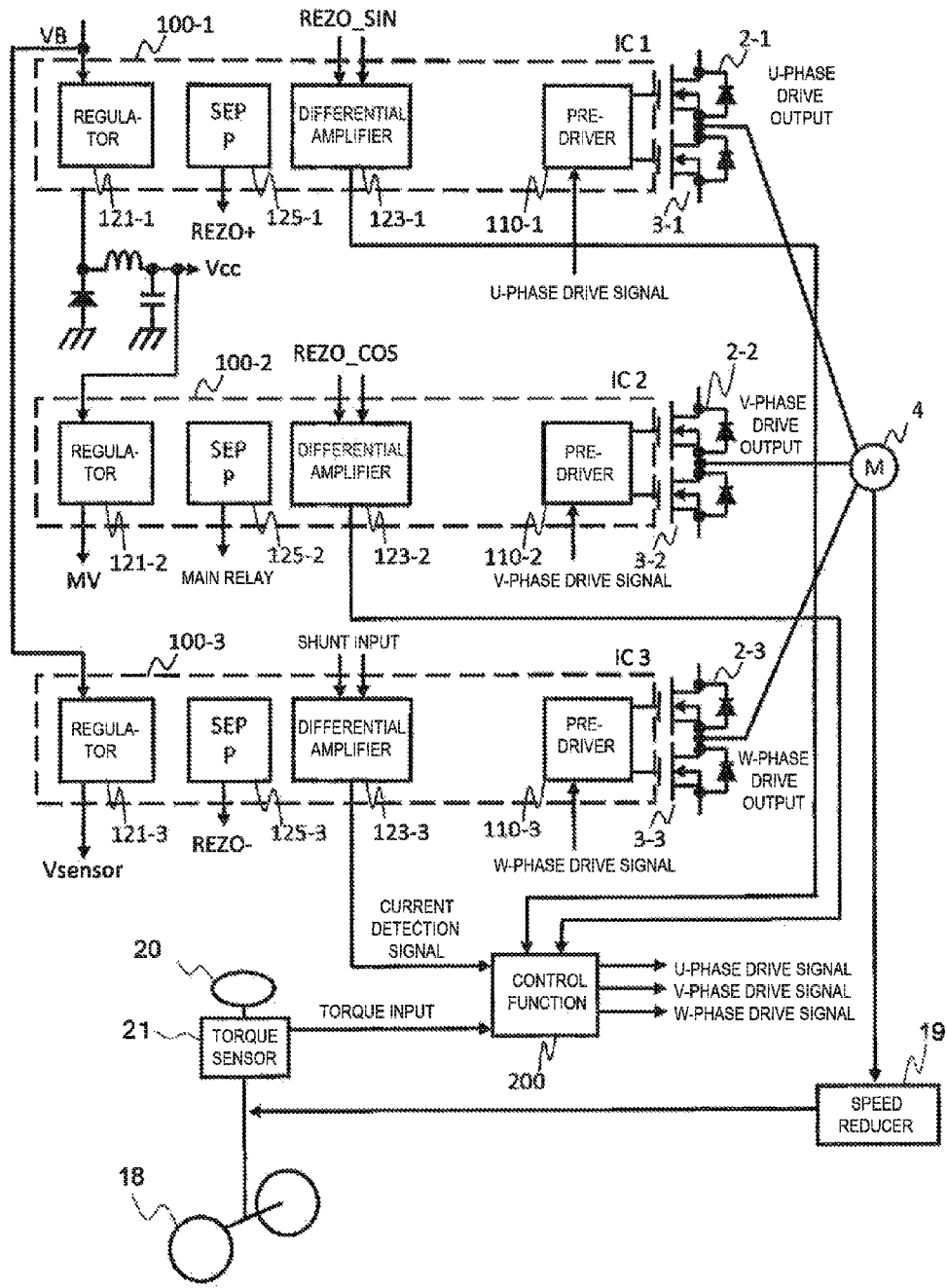

[FIG. 15]

| GENERAL SPECIFICATIONS | | MODE A (IC 1) | MODE B (IC 2) | MODE C (IC 3) |
|---|---|---|---|---|
| M | REGULATOR | 5 V SWITCHING REGULATOR (121-1) | 3.3 V LINEAR REGULATOR (121-2) | SENSOR POWER SOURCE (121-3) |
| M | RESET | POWER-ON RESET (122-1) | 5 V-TYPE VOLTAGE DROP RESET (122-2) | 3.3 V-TYPE VOLTAGE DROP RESET (122-3) |
| | WDT | WDT(1228-1) | WDT(1228-2) | WDT(1228-3) |
| | PRE-DRIVER | PRE-DRIVER U (110-1) | PRE-DRIVER V (110-2) | PRE-DRIVER W (110-3) |
| | DRIVER | RELAY DRIVER U | RELAY DRIVER V | RELAY DRIVER W |
| | CHARGE PUMP | CHARGE PUMP FOR PRE-DRIVER U | CHARGE PUMP FOR PRE-DRIVER V | CHARGE PUMP FOR PRE-DRIVER W |
| | CURRENT DETECTION | CURRENT DETECTION U | CURRENT DETECTION V | CURRENT DETECTION W |
| M | DIFFERENTIAL INPUT CIRCUIT | RESOLVER SIN SIGNAL (123-1) | RESOLVER COS SIGNAL (123-2) | TOTAL CURRENT (123-3) |
| | SEPP OUTPUT | RESOLVER MAGNETIC EXCITATION SIGNAL + (125-1) | MAIN RELAY (125-2) | RESOLVER MAGNETIC EXCITATION SIGNAL - (125-3) |

[FIG. 16]

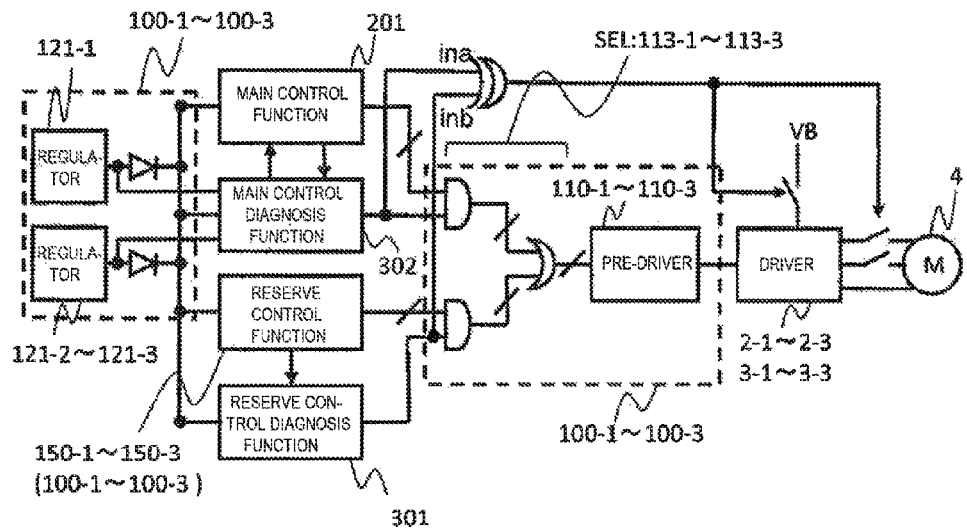

[FIG. 17]
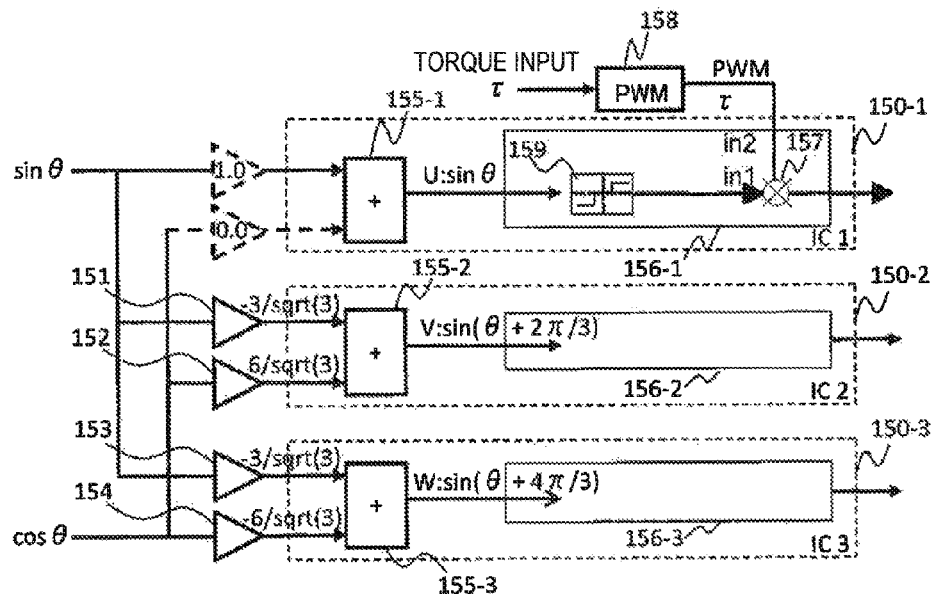
[FIG. 18]
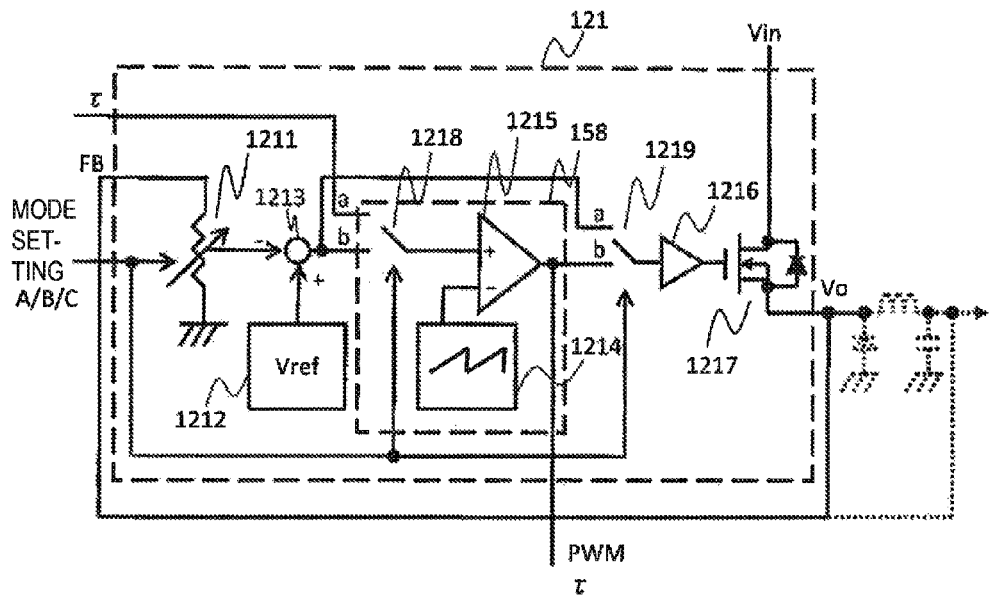
[FIG. 19]
| MODE | SWITCH 1218 | SWITCH 1219 | FUNCTION |
|---|---|---|---|
| A | b | b | SWITCHING REGULATOR |
| B | a | a | LINEAR REGULATOR/TORQUE PWM MODULATION |
| C | a | a | LINEAR REGULATOR/TORQUE PWM MODULATION |

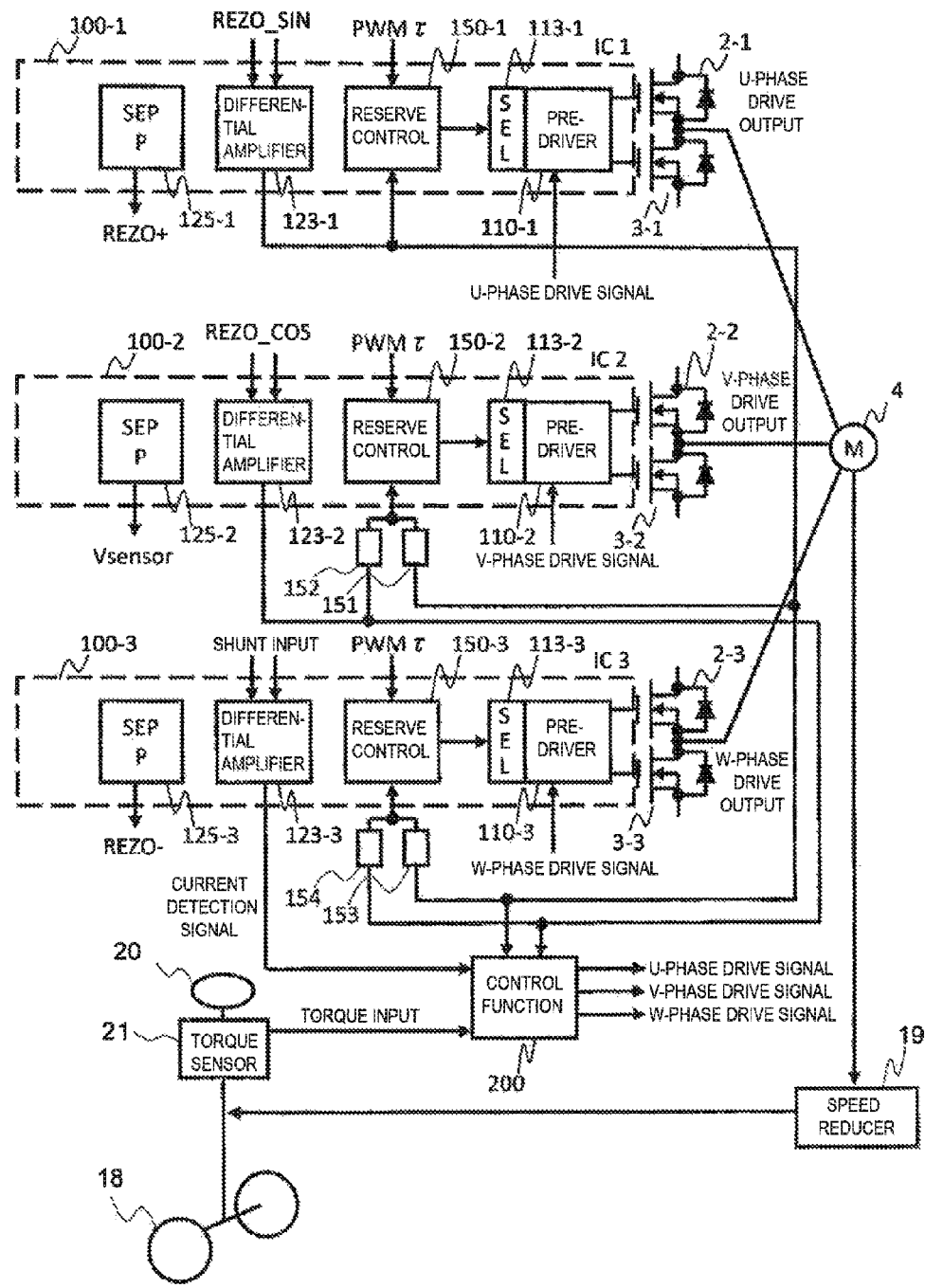
[FIG. 20]

[FIG. 21]
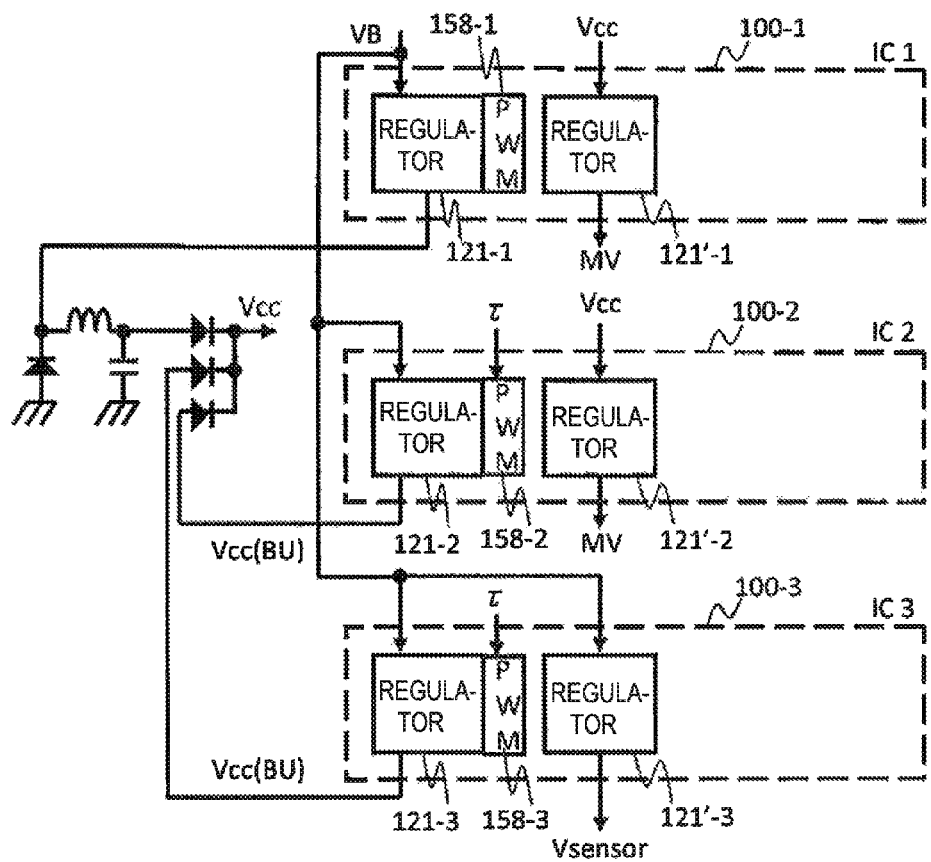

[FIG. 22]

| GENERAL SPECIFICATIONS | | MODE A (IC 1) | MODE B (IC2) | MODE C (IC 3) |
|---|---|---|---|---|
| M | REGULATOR | 5 V SWITCHING REGULATOR (121-1) | 5 V LINEAR REGULATOR (121-2) | 5 V LINEAR REGULATOR (121-3) |
| M | REGULATOR | 3.3 V LINEAR REGULATOR (121'-1) | 3.3 V LINEAR REGULATOR (121'-2) | SENSOR POWER SOURCE (121'-3) |
| M | RESET | POWER-ON RESET (122-1) | 5 V-TYPE VOLTAGE DROP RESET (122-2) | 3.3 V-TYPE VOLTAGE DROP RESET (122-3) |
|   | WDT | WDT (1228-1) | WDT (1228-2) | WDT (1228-3) |
|   | PRE-DRIVER | PRE-DRIVER U (110-1) | PRE-DRIVER V (110-2) | PRE-DRIVER W (110-3) |
|   | DRIVER | RELAY DRIVER U | RELAY DRIVER V | RELAY DRIVER W |
|   | CHARGE PUMP | CHARGE PUMP FOR PRE-DRIVER U | CHARGE PUMP FOR PRE-DRIVER V | CHARGE PUMP FOR PRE-DRIVER W |
|   | PRE-DRIVER INPUT SELECTOR | PRE-DRIVER U INPUT SELECTOR (113-1) | PRE-DRIVER V INPUT SELECTOR (113-2) | PRE-DRIVER W INPUT SELECTOR (113-3) |
|   | RESERVE CONTROL FUNCTION | RESERVE CONTROL FUNCTION U (150-1) | RESERVE CONTROL FUNCTION V (150-2) | RESERVE CONTROL FUNCTION W (150-3) |
| M | PWM MODULATION CIRCUIT | FOR SWITCHING REGULATOR (158-1) | FOR TORQUE SIGNAL MODULATION (158-2) | FOR TORQUE SIGNAL MODULATION (158-3) |
|   | CURRENT DETECTION | CURRENT DETECTION U | CURRENT DETECTION V | CURRENT DETECTION W |
| M | DIFFERENTIAL INPUT CIRCUIT | RESOLVER SIN SIGNAL (123-1) | RESOLVER COS SIGNAL (123-2) | TOTAL CURRENT (123-3) |
|   | SEPP OUTPUT | RESOLVER MAGNETIC EXCITATION SIGNAL + (125-1) | SENSOR POWER SOURCE (125-2) | RESOLVER MAGNETIC EXCITATION SIGNAL - (125-3) |

[FIG. 23]
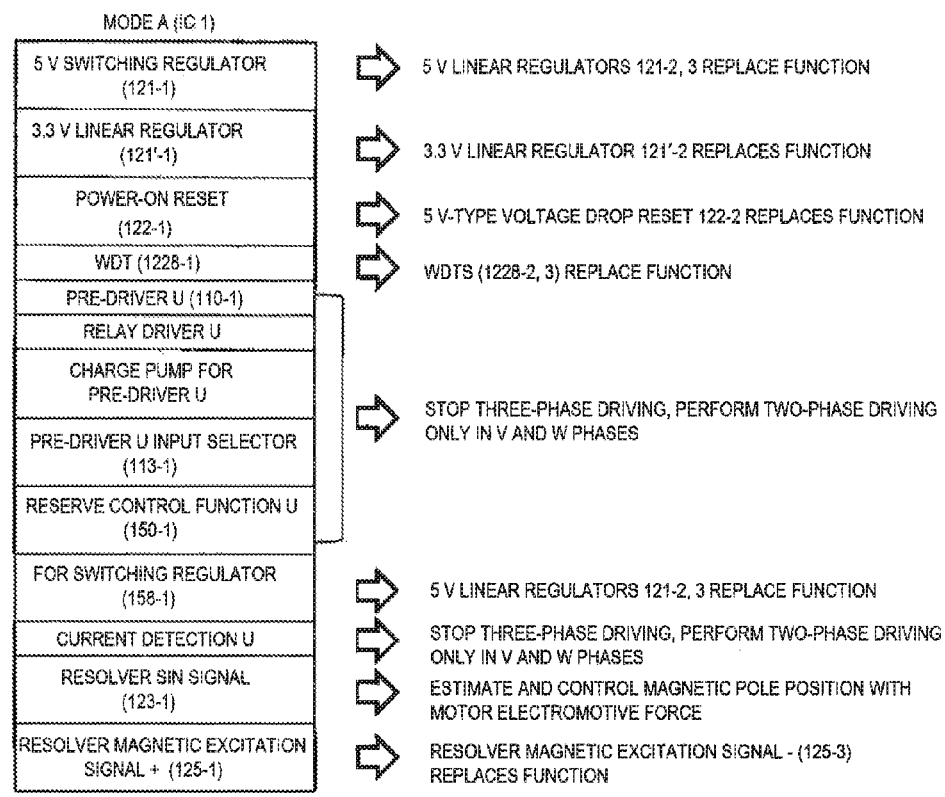

[FIG. 24]
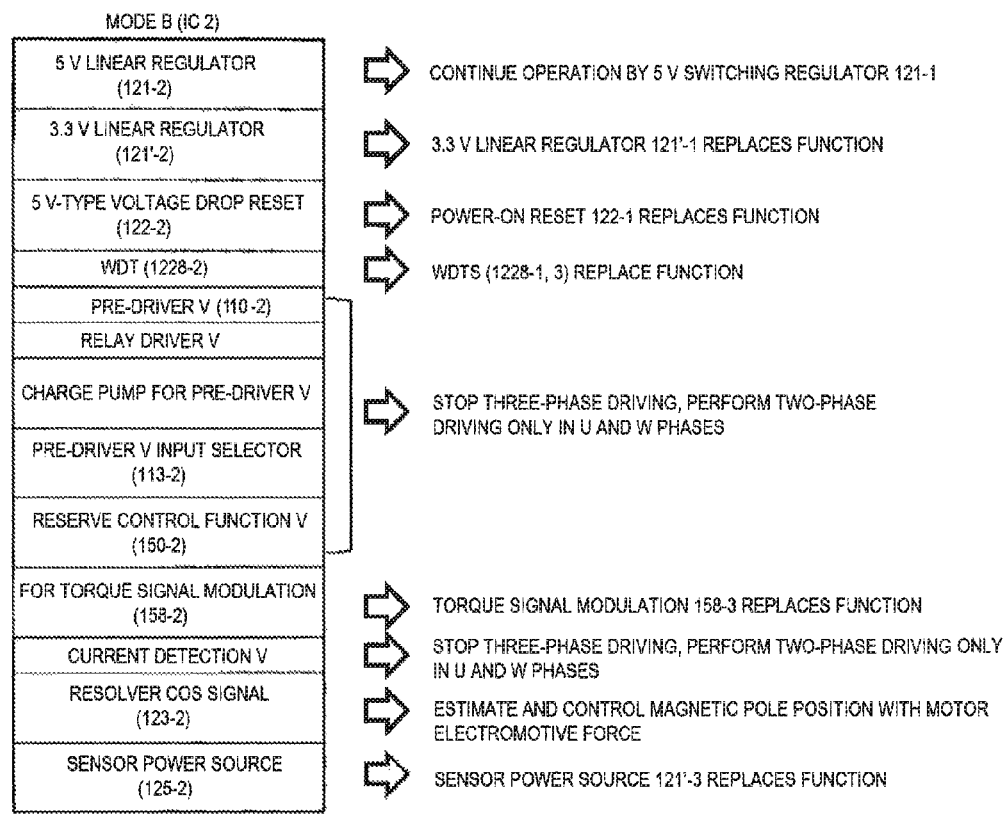

[FIG. 25]
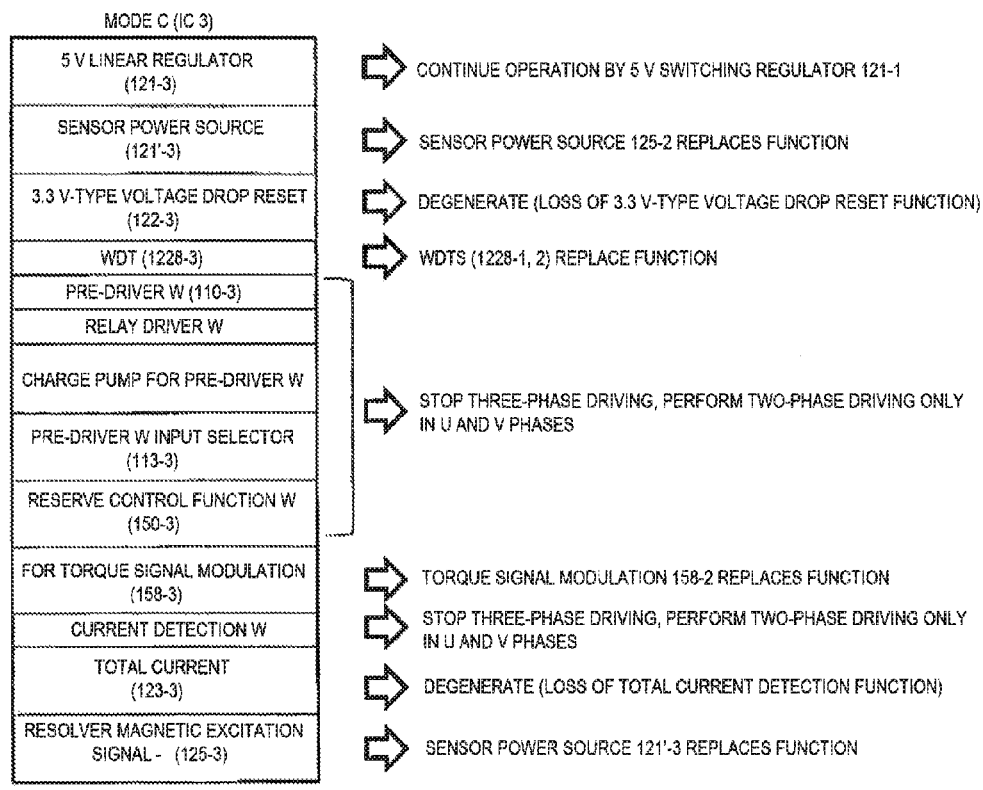

[FIG. 26]
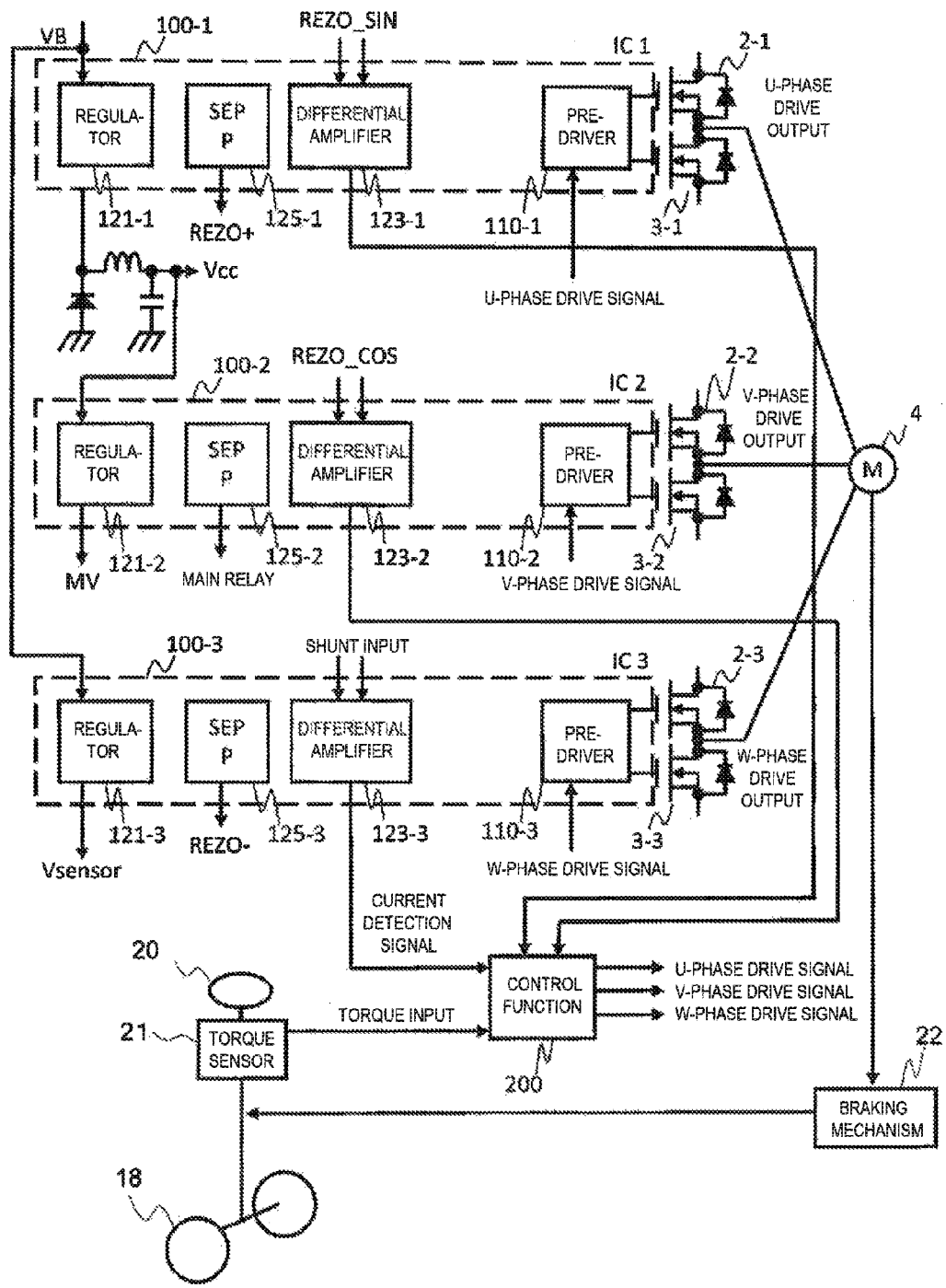

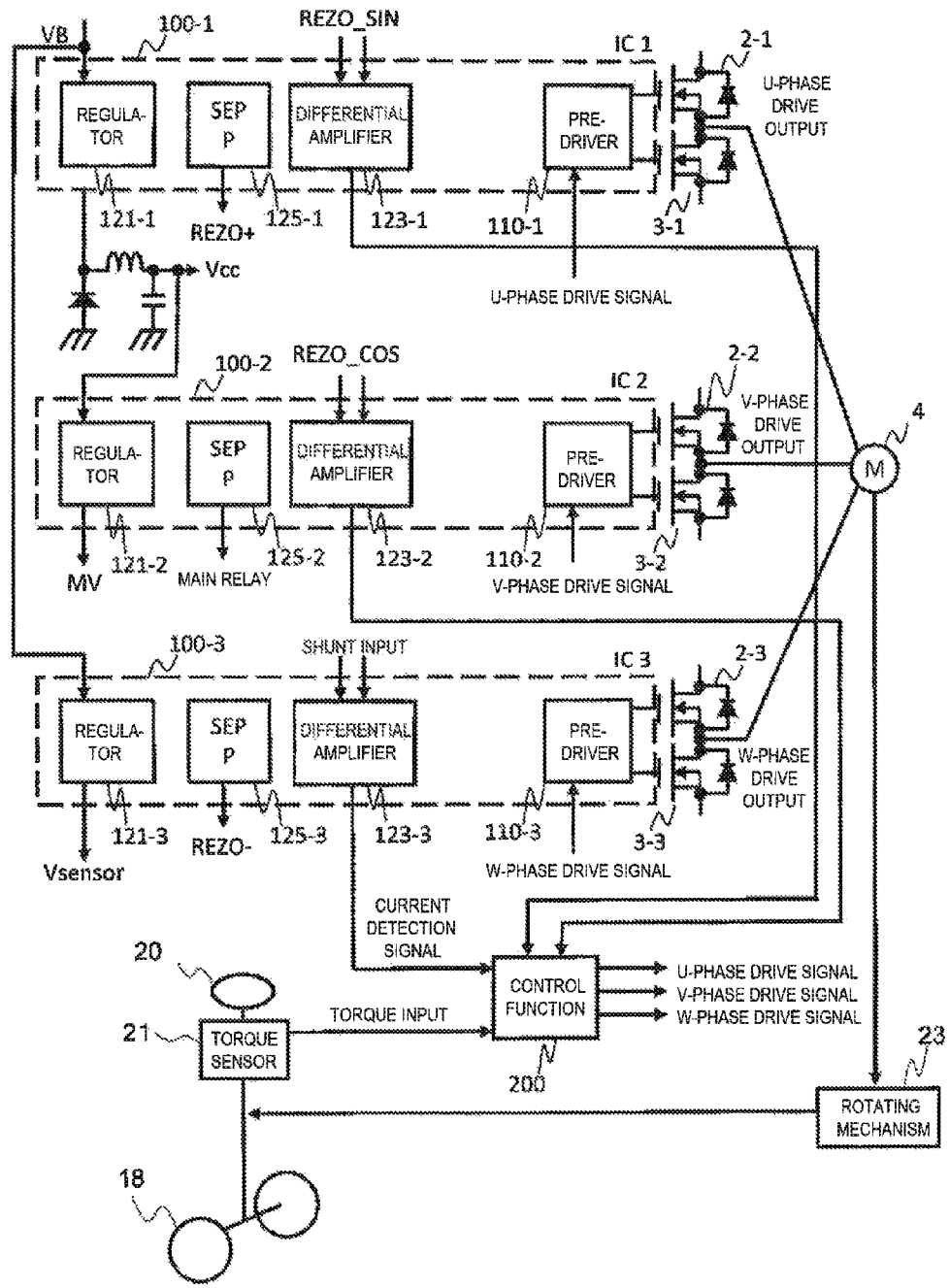
[FIG. 27]

MOTOR DRIVING CIRCUIT, MOTOR DRIVING SYSTEM, ELECTRIC POWER STEERING SYSTEM, ELECTRIC BRAKE SYSTEM, AND VEHICLE DRIVING SYSTEM

TECHNICAL FIELD

The present invention relates to a motor driving circuit for driving a multiphase motor.

BACKGROUND ART

Recently, as automation of control advances, there is increasing demand for safety and reliability of electronic control devices. To secure safety of electronic control devices, it is demanded that, when an abnormality occurs, the abnormality should be detected and operation should be stopped immediately. Moreover, not only the immediate stop of operation when a failure occurs, but also continuation of normal operation has come to be demanded.

The PTL 1 below describes a control system in which, if a failure occurs in one phase of driving circuits corresponding to three phases for driving a brushless motor, the driving circuits corresponding to the remaining two phases continue driving the motor.

CITATION LIST

Patent Literature

PTL 1: JP-A-2011-51481

SUMMARY OF INVENTION

Technical Problem

According to the above PTL 1, it is possible to continue driving the motor even if a failure occurs. However, since the driving circuits of the respective phases are identical, there is a possibility that functions extending across the phases may overlap between the driving circuits, resulting in a redundant circuit configuration.

In view of the foregoing problem, it is an object of the invention to provide a motor driving circuit in which a portion corresponding to a failed phase can be separated while miniaturization and lower costs are achieved.

Solution to Problem

A motor driving circuit according to the invention includes: a pre-driver which drives each phase of a multiphase motor; and an electrical circuit which switches a connecting relation between internal electrical components according to a designated operation mode and thereby provides a circuit function corresponding to the operation mode.

Advantageous Effect of Invention

With the motor driving circuit according to the invention, since a pre-driver that is necessary for each phase is provided in each driving circuit corresponding to one phase, packaging efficiency is increased by elimination of redundancy, and the circuit can be divided so that a failure in one phase will not extend to the other phases. Also, since switching between circuit functions can be made according to the operation mode, the development cost can be reduced by restraining the types of circuits to be developed.

Other problems, configurations and effects than those described above will be clarified by the description of embodiments below.

BRIEF DESCRIPTION OF DRAWING

FIG. 1 is a circuit block diagram of a motor driving circuit 100 according to Embodiment 1.

FIG. 2 is a view showing a circuit example for driving a brushless DC motor 4 using the motor driving circuit 100 according to Embodiment 1.

FIG. 3 is a view showing a circuit example in which electrical circuits 120-1 to 120-3 are configured as regulators 121-1 to 121-3 that are different from each other.

FIG. 4 is a view showing a specific example of FIG. 3.

FIG. 5 is a view showing a circuit example in which the electrical circuit 120 is configured as a regulator 121.

FIG. 6 is a table showing the correspondence between the operation mode of the regulator 121, the connecting relation between the respective electrical components, and the circuit function provided by the regulator 121.

FIG. 7 is a view showing a circuit example in which the electrical circuit 120 is configured as a reset circuit 122.

FIG. 8 is a table showing the correspondence between the operation mode of the reset circuit 122, the connecting relation between the respective electrical components, and the circuit function provided by the reset circuit 122.

FIG. 9 is a view showing a circuit example in which the electrical circuit 120 is configured as a differential input circuit 123.

FIG. 10 is a view showing a circuit example of a hold circuit 124.

FIG. 11 is a table showing the correspondence between the operation mode of the hold circuit 124, the connecting relation between respective electrical components, and the circuit function provided by the hold circuit 124.

FIG. 12 is a view showing a modification example of the differential input circuit 123.

FIG. 13 is a table showing the correspondence between the operation mode of the differential input circuit 123, the connecting relation between respective electrical components, and the circuit function provided by the differential input circuit 123.

FIG. 14 is a circuit diagram of a motor driving system according to Embodiment 5 and an electric power steering system using the same.

FIG. 15 is a table showing mode setting in each motor driving circuit 100 shown in FIG. 14.

FIG. 16 is a circuit diagram of a motor driving system according to Embodiment 6 and an electric power steering system using the same.

FIG. 17 is a view showing a circuit example of a reserve control function 150.

FIG. 18 is a view showing a circuit example in which a sawtooth wave oscillator 1214 and a comparator 1215 are used also as a PWM modulator 158 in the regulator 121.

FIG. 19 is a table showing the correspondence between the operation mode of the regulator 121, the connecting relation between respective electrical components, and the circuit function provided by the regulator 121.

FIG. 20 is a view showing the circuit configuration of other parts than a power source section in a motor driving system and an electric power steering system according to Embodiment 7.

FIG. 21 is a view showing the circuit configuration of the power source section in the motor driving system and the electric power steering system according to Embodiment 7.

FIG. 22 is a table showing mode setting in each motor driving circuit 100 shown in FIG. 21.

FIG. 23 is a view showing the operation in the case where a motor driving circuit 100-1 has failed.

FIG. 24 is a view showing the operation in the case where a motor driving circuit 100-2 has failed.

FIG. 25 is a view showing the operation in the case where a motor driving circuit 100-3 has failed.

FIG. 26 is a circuit diagram of an electric brake system according to Embodiment 8.

FIG. 27 is a circuit diagram of a vehicle driving system according to Embodiment 8.

DESCRIPTION OF EMBODIMENTS

Basic Idea of Invention

Figure 28:
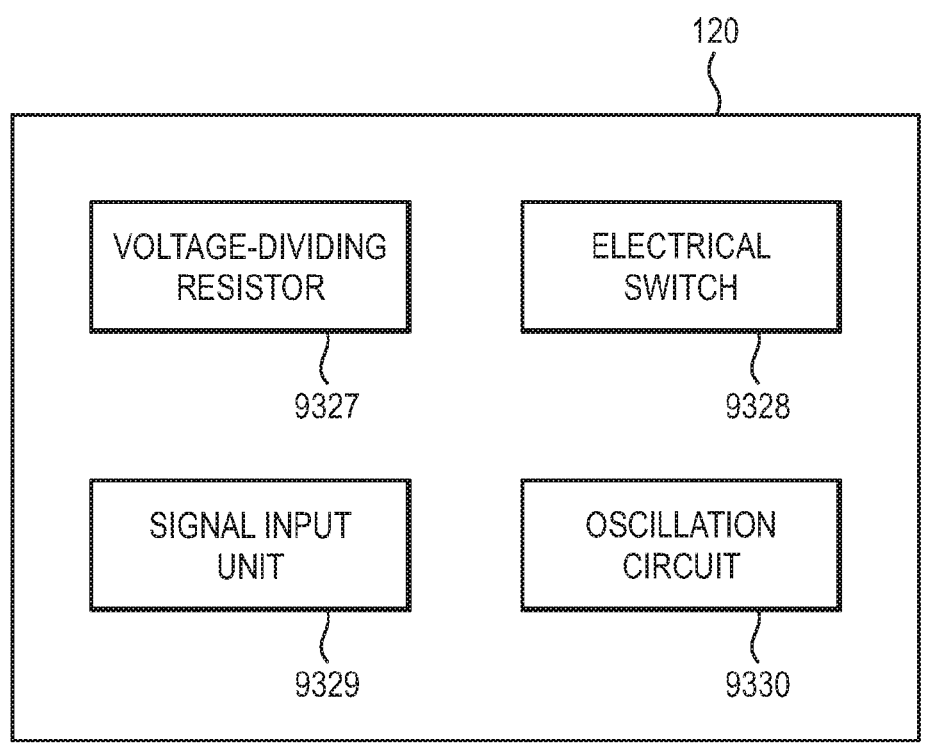
FIG. 28 is a diagram showing the composition of the electrical circuit.

Hereinafter, the basic idea of the invention will be described first and specific embodiments will be described subsequently. Particularly, various configuration examples of circuit functions that vary according to the operation mode will be described with specific examples in each embodiment.

In the invention, an integrated circuit forming a motor driving circuit is formed as an N-chip configuration (N: number of phases of the multiphase motor). Necessary functions for each phase are provided inside an integrated circuit chip ASIC (application specified integrated circuit) of each phase. Thus, packaging efficiency is increased by elimination of redundancy, and division of the circuit is achieved so that a failure in one phase will not extend to the other phases. Common necessary functions extending across the phases are gathered into each group of similar functions and configured in such a way that switching between respective functions that are similar to each other can be made according to the operation mode setting.

The necessary functions for each phase include a pre-driver of each phase of the multiphase motor, a charge pump for the pre-driver, a current detection circuit and voltage detection circuit for each phase, and the like. The pre-driver is a circuit for driving the driving circuit of each phase which supplies a drive current corresponding to each phase of the multiphase motor. In the case of driving an N-phase motor, an N-chip integrated circuit is used, thereby providing each phase with necessary circuit elements for each phase. Therefore, unnecessary or excessive redundancy can be eliminated.

The common necessary functions extending across the phases include a power supply circuit, an input circuit, an output circuit, and the like. The power supply circuit has the difference in output voltage, the difference in switching regulator/linear regulator, and the like. However, these are similar functions and therefore configured in such a way that switching between the functions can be made according to the operation mode. Similarly, the input circuit is configured to switch functions according to the difference in gain, input voltage range, sample and hold/peak hold, and the like. The output circuit is configured in such a way that switching between the functions can be made according to the difference in gain, voltage driving/current driving, and the like. These circuit elements are configured in advance as a single electrical circuit in which similar functions are gathered, and are configured in such a way that switching between the functions can be made according to the operation mode. Thus, circuit elements no longer need to be packaged for each of the individual circuit functions and therefore development costs can be restrained.

Embodiment 1

FIG. 1 is a circuit block diagram of a motor driving circuit 100 according to Embodiment 1 of the invention. The motor driving circuit 100 is configured as an IC chip and includes a pre-driver 110 and an electrical circuit 120. The electrical circuit 120 has one of operation modes A, B and C designated by a mode setting signal inputted from outside the motor driving circuit 100, and provides a circuit function corresponding to the designated operation mode.

The mode setting signal can be formed by a voltage applied to the mode input pins of the motor driving circuit 100. For example, if the input level, of pins 1 and 2 is L and L, the mode A is set. If the input level is L and H, the mode B is set. If the input level is H and L, the mode C is set. Other than this, methods such as writing the value of the operation mode inside the motor driving circuit 100 by serial communication or the like may be considered. The case of setting the operation mode by a voltage applied to the mode input pins of the motor driving circuit 100 is desirable in view of certainty of operation, because the operation mode can be set without pulling up or down the mode input pins and the influence of function failure in serial communication or the like need not be considered, either.

FIG. 2 is a view showing a circuit example in which a brushless DC motor 4 is driven, using the motor driving circuit 100 according to this Embodiment 1. Each of motor driving circuits 100-1 to 100-3 is the motor driving circuit 100 shown in FIG. 1 but is different from each other in the operation mode of the electrical circuit 120. Hereinafter, in order to distinguish each circuit unit, subscripts corresponding to the respective phases are added according to need.

Pre-drivers 110-1 to 110-3 provided respectively in the motor driving circuits 100-1 to 100-3 drive MOSFETs 2-1 to 2-3 and 3-1 to 3-3, respectively, to supply drive currents to U, V and W phases of the motor 4. Electrical circuits 120-1 to 120-3 are set to operation modes A, B and C, respectively, by mode setting signals, and provide circuit functions A, B and C, respectively. The motor driving circuits 100-1 to 100-3 are configured to integrate the functions of the pre-drivers 110-1 to 110-3 and the circuit functions A, B and C of the respective phases and thus be able to provide necessary functions as a circuit for driving the brushless DC motor 4.

Embodiment 2

FIG. 3 is a view showing a circuit example in which the electrical circuits 120-1 to 120-3 are configured as regulators 121-1 to 121-3 that different from each other. As the types of the regulators 121, for example, the difference between a switching regulator and a linear regulator, the difference in output voltage, and the like can be considered. There are cases where multiple types of regulators are required in a motor driving system. Therefore, the different regulators 121 from each other are packaged as similar circuit functions in the respective motor driving circuits 100, as shown in FIG. 3. Thus, the respective regulator functions can be provided according to the switching of the operation mode.

FIG. 4 is a view showing a specific example of FIG. 3. Of the respective regulators, the regulator A (121-1) can be configured as a 5 V switching regulator, the regulator B (121-2) can be configured as a 3.3 V linear regulator, and the regulator C (121-3) can be configured as a sensor power source regulator, for example, as shown in FIG. 4. As a matter of convenience in the description, the mode setting signals are omitted when appropriate.

FIG. 5 is a view showing a circuit example in which the electrical circuit 120 is configured as a regulator 121. The output voltage of the regulator 121 is fed back to a voltage-dividing resistor 1211 from an FB terminal, via the route indicated by solid lines if the regulator 121 is configured as a linear regulator, and via the route indicated by dashed lines if the regulator 121 is configured as a switching regulator. The voltage-dividing resistor 1211 divides the voltage that is fed back, at a voltage division ratio corresponding to the mode setting. An arithmetic unit 1213 compares the output from the voltage-dividing resistor 1211 with a reference voltage Vref 1212. A comparator 1215 compares the result of the comparison by the arithmetic unit 1213 with an output from a sawtooth wave oscillator 1214, and outputs the result to a driver 1216. The driver 1216 drives a MOSFET (metal oxide semiconductor field effect transistor) 1217 according to the output from the comparator 1215. The MOSFET 1217 outputs an output voltage Vo according to an input voltage Vin and the operation of the driver 1216.

FIG. 6 is a table showing the correspondence between the operation mode of the regulator 121, the connecting relation between the respective electrical components, and the circuit function provided by the regulator 121. The type of the regulator can be classified according to the output voltage and the presence or absence of the switching operation. Thus, by switching between these according to the operation mode, the single electrical circuit 120 can provide different regulator functions.

Specifically, by switching the voltage division ratio of the voltage-dividing resistor 1211 and oscillation ON/OFF of the sawtooth wave oscillator 1214 according to the operation mode, different regulator functions for the respective operation modes can be provided, as shown in FIG. 6.

The regulator 121 is suitable not only for achieving separation of a circuit failure in each of the U, V and W phases, which is the original purpose of the electrical circuit 120, but also for realizing a versatile integrated circuit. In a control unit, microcomputers with various performances need to be installed according to the functions thereof. However, power consumption may vary largely, depending on the installed microcomputer. For example, in a high-end control unit, a high-performance microcomputer that matches with the functions thereof is installed. Therefore, the regulator 121 having a mode switching function is made to operate as a switching regulator. In this case, external components such as a diode, coil and capacitor are needed. However, since a large current can be supplied from the regulator 121, a sufficient power source to allow the high-performance microcomputer to operate can be supplied. Meanwhile, in a low-end control unit, since power consumption by the installed microcomputer is small, the operation of the regulator 121 as a linear regulator causes no problem of heating. Moreover, external components such as a diode, coil and capacitor are not needed and therefore costs can be reduced.

Embodiment 3

FIG. 7 is a view showing a circuit example in which the electrical circuit 120 is configured as a reset circuit 122. Here, an example of a reset circuit which monitors a drop in power supply voltage and an operation stop in the processor and outputs a reset signal when these abnormalities are detected is illustrated.

A power supply voltage is inputted from a Vsense terminal. A voltage-dividing resistor 1221 divides the power supply voltage at a voltage division ratio corresponding to the operation mode. The output from the voltage-dividing resistor 1221 is inputted to a capacitor 1223 via a switch 1222 and also inputted to a comparator 1225. The comparator 1225 compares the output from the voltage-dividing resistor 1221 with a reference voltage Vref 1224, and outputs the result to a MOSFET 1226. The MOSFET 1226 is driven according to a voltage pulled up by a pull-up resistor and the output from the comparator 1225, and outputs a NMI (non-maskable interrupt) signal. The output from the comparator 1225 is also outputted to an OR gate 1229.

A viability notification signal PRUN from the processor is inputted to a watchdog timer 1228. The watchdog timer 1228 monitors the viability notification signal PRUN in a predetermined cycle, and if this is not detected, the watchdog timer 1228 outputs a signal to that effect to a MOSFET 1227 via the OR gate 1229. The MOSFET 1227 is driven according to a voltage pulled up by a pull-up resistor and the output from the OR gate 1229, and outputs a reset signal RES. That is, it means that the reset signal RES is outputted if one of the power supply voltage and the processor operates abnormally.

Although the reset circuit 122 can be used as a circuit for outputting the reset signal RES when an abnormal operation is detected, the reset circuit 122 can also be used as a power-on reset circuit for initializing each circuit unit when power is turned on. The power-on reset circuit is a circuit which continues to output the reset signal RES and the NMI signal continuously for a predetermined time after power is turned on. Therefore, by configuring the reset circuit 122 to be able to switch the time for which these signals continue to be outputted, switching between the ordinary reset circuit function and the power-on reset circuit function can be made.

FIG. 8 is a table showing the correspondence between the operation mode of the reset circuit 122, the connecting relation between the respective electrical components, and the circuit function provided by the reset circuit 122. The type of the reset circuit 122 can be classified according to the detection threshold value and whether to continue outputting the signals or not. Thus, by switching between these according to the operation mode, the single electrical circuit 120 can provide different reset circuit functions.

In the mode A, the switch 1222 is ON, and the NMI signal and the reset signal RES are continuously outputted for a predetermined time after power is turned on, according to a time constant decided by the voltage-dividing resistor 1221 and the capacitor 1223. Thus, the power-on reset circuit function is provided. In the modes B and C, the Vsense terminal is connected to a 5 V-type power source and a 3.3 V-type power source, respectively, and the voltage division ratio of the voltage-dividing resistor 1221 is set according to this. Thus, the function as a voltage drop reset circuit of outputting the NMI signal and the reset signal RES when the power supply voltage falls below a predetermined voltage can be provided.

Since the respective NMI signals and the respective reset signals RES have similar roles, wired OR connection enables such a configuration that a reset operation is carried out if one of them is ON. In the actual circuit, the NMI signals and the reset signals RES of the reset circuits 122-1 to 122-3 provided in the motor driving circuits 100-1 to 100-3, respectively, can be connected by wired OR connection, the NMI signals being connected to each other and the reset signals RES being connected to each other. At this time, since the outputs of the watchdog timers 1228-1 to 1228-3 are connected in parallel to each other, the watchdog timers 1228 can be formed as a redundant configuration, or the respective watchdog timers 1228 can monitor the operation of a monitoring target in different cycles from each other.

Moreover, by turning the switch 1222 ON in the mode B shown in FIG. 8, the power-on reset function and the 5 V-type voltage drop reset function can be shared in the modes A and B, and wired OR connection of the NMI signals and the reset signals RES in the two enables redundancy.

Embodiment 4

FIG. 9 is a view showing a circuit example in which the electrical circuit 120 is configured as a differential input circuit 123. Here, an example in which a resolver signal for detecting the magnetic pole position of the motor and an end-to-end potential difference signal of a shunt resistor for detecting the total current supplied to the motor are detected differentially, as different input signals that are necessary for motor control, is described.

It is desirable that the resolver signal is sampled and held synchronously with a signal that magnetically excites the resolver. Meanwhile, as for the end-to-end potential difference signal of the shunt resistor for measuring the total current, it is desirable that its peak is held. Thus, the differential input circuit 123 is configured to be able to switch between the sample and hold function and the peak hold function according to the operation mode.

The differential input signal inputted to the differential input circuit 123 is amplified by a differential amplifier 1231 and inputted to a hold circuit 124. The amplification rate of the differential amplifier 1231 is decided by resistors Ri and Rf. The hold circuit 124 operates as a sample and hold circuit or a peak hold circuit according to the operation mode setting. When operating as a sample and hold circuit, the hold circuit 124 samples the differential input signal according to a sampling trigger signal. When operating as a peak hold circuit, the hold circuit 124 holds a maximum value of the differential input signal until a reset signal is inputted.

FIG. 10 is a view showing a circuit example of the hold circuit 124. The differential input signal amplified by the differential amplifier 1231 is inputted to a capacitor 1244 via a switch 1241 or via a diode 1243 and a switch 1242, and then inputted to a voltage follower 1246 connected in parallel to the capacitor 1244. The voltage follower 1246 outputs the received signal.

FIG. 11 is a table showing the correspondence between the operation mode of the hold circuit 124, the connecting relation between the respective electrical components, and the circuit function provided by the hold circuit 124. The circuit may be configured to receive the differential input signal according to the ON/OFF of the sampling trigger signal, in the case of operating as a sample and hold circuit, and to discharge the capacitor 1244 when a reset signal is inputted, in the case of operating as a peak hold circuit.

The modes A and B have a common configuration. The hold circuit 124 operates as a sample and hold circuit. In these operation modes, the switch 1241 is ON when the sampling trigger signal is ON, and the switch 1241 is OFF when the sampling trigger signal is OFF. The switches 1242 and 1245 are constantly OFF. In the mode C, the hold circuit 124 operates as a peak hold circuit. In this operation mode, the switch 1242 is OFF and the switch 1245 is ON when the reset signal is ON, and the switch 1242 is ON and the switch 1245 is OFF when the reset signal is OFF. The switch 1241 is constantly OFF.

FIG. 12 is a view showing a modification example of the differential input circuit 123. The differential input circuit 123 shown in FIG. 12 realizes a preferable configuration as a circuit which loops the output from the differential amplifier 1241 in the operation mode C and thus shifts the voltage level, thereby detecting the total current supplied to the motor.

The output from the differential amplifier 1241 is configured to be looped by a loop circuit including the switch 1244 and the MOSFET 1246. This loop circuit may be turned ON only when in the mode C. Similarly, the hold circuit 124 may employ the output of the loop circuit only when in the mode C.

FIG. 13 is a table showing the correspondence between the operation mode of the differential input circuit 123, the connecting relation between the respective electrical components, and the circuit function provided by the differential input circuit 123. In the modes A and B, the switches 1242 and 1243 are ON, the switch 1244 is OFF, and the point to which the switch 1245 is connected is the terminal a in FIG. 12. In the mode C, the switches 1242 and 1243 are OFF, the switch 1244 is ON, and the point to which the switch 1245 is connected is the terminal b in FIG. 12.

According to the configuration shown in FIGS. 12 and 13, when in the mode C, a current path is formed in order of IN+→Ri→switch 1244→MOSFET 1246→RL→ground. If the potential difference between IN+ and IN− is Vi, the MOSFET 1246 is controlled in such a way that a current achieving a potential difference of 0 between the input terminals of the differential amplifier 1241, that is, a voltage drop of Vi due to Ri, flows, by the feedback operation of the differential amplifier 1241.

Therefore, in this current path, a current I that achieves $$Ri \times I = Vi,$$

that is, $$I = Vi/Ri,$$

flows. Therefore, to the resistor RL, a voltage proportional to the potential difference Vi, $$RL \times I = Vi \times RL/Ri,$$

is outputted.

As described above, the differential input circuit 123 shown in FIG. 12 can shift the level of the end-to-end potential difference of the shunt resistor near the power supply voltage to the ground potential reference voltage, at the time of the total current detection operation in the mode C. This can facilitate detection of the end-to-end potential difference of the shunt resistor, that is, the total current supplied to the motor.

Embodiment 5

FIG. 14 is a circuit diagram of a motor driving system according to Embodiment 5 of the invention and an electric power steering system using the same. The motor 4 is driven by the motor driving circuits 100-1 to 100-3 and provides motive power to assist the operation of a steering mechanism 18.

A control function 200 is attached to the shaft of a steering wheel 20 and outputs drive signals of the U, V and W phases based on a torque input from a torque sensor 21 for measuring the torque with which the driver steers the steering wheel 20, resolver signals indicating the magnetic pole position from the differential input circuits 123-1 and 123-2, and a current detection signal from the differential input circuit 123-3. The pre-drivers 110-1 to 110-3 drive the motor 4 via a three-phase, inverter with MOSFETs 2-1 to 2-3 and 3-1 to 3-3 according to the drive signals. The motor 4 controls the steering mechanism 18 via a speed reducer 19.

In many cases, relay switch contacts are inserted in series in the paths through which a current is supplied from the MOSFETs 2-1 to 2-3 and 3-1 to 3-3 to the motor 4, and the paths through which power is supplied to the MOSFETs 2-1 to 2-3 and 3-1 to 3-3. However, in FIG. 14, such contacts are omitted in order to simplify the description.

FIG. 15 is a table showing the mode setting of each motor driving circuit 100 shown in FIG. 14. For comparison, general circuit specifications are described as well. The motor driving circuit 100 has the pre-driver 110 as a necessary function for each phase, and also has the regulator 121, the reset circuit 122 (not shown), the differential input circuit 123, and a SEPP (single-ended push-pull) output circuit 125 as necessary functions that are common across the respective phases.

The regulator 121 in the motor driving circuit 100-1 is set to the mode A and operates as the 5 V switching regulator 121-1, as described in Embodiment 2. The regulator 121 in the motor driving circuit 100-2 is set to the mode B and operates as the 3.3 V linear regulator 121-2. The regulator 121 in the motor driving circuit 100-3 is set to the mode C and operates as the sensor power source regulator 121-3.

The reset circuit 122 in the motor driving circuit 100-1 is set to the mode A and operates as the power-on reset circuit 122-1, as described in Embodiment 3. The reset circuit 122 in the motor driving circuit 100-2 is set to the mode B and operates as the 5 V-type voltage drop reset circuit 122-2. The reset circuit 122 in the motor driving circuit 100-3 is set to the mode C and operates as the 3.3 V-type voltage drop reset circuit 122-3.

The watchdog timers 1228-1 to 1228-3 are connected in parallel and carry out monitoring with redundant configurations or in different cycles. The pre-drivers 110-1 to 110-3, the drivers, the charge pumps, and the current detection circuits have the same functions for the respective phases and operate independently for each phase within each motor driving circuit 100.

Embodiment 6

FIG. 16 is a circuit diagram of a motor driving system according to Embodiment 6 of the invention and an electric power steering system using the same. As a matter of convenience in description, only parts relating to the motor driving system are shown. The steering assistance mechanism is similar to Embodiment 5. The motor driving system according to Embodiment 6 has a reserve control function in addition to the configuration described in Embodiment 5. It should be noted that an application has already been filed by the inventors of the present application, with respect to a motor driving system having a reserve control function (PCT/JP2011/063725).

In this Embodiment 6, a selector 113 switches between the output from a main control function 201 and the output from a reserve control function 150 on the basis of the results of diagnosis by a main control diagnosis function 302 and a reserve control diagnosis function 301. The output from the main control diagnosis function 302 and the output from the reserve control diagnosis function 301 represent normality if it is H-level and abnormality if it is L-level. When one of these results of diagnosis is normality (H-level), a battery voltage VB is supplied to the drivers 2 and 3, and the relay switch for driving the motor 4 turns ON to drive the motor 4.

As an example of a method for packaging each part, for example, the main control function 201 is arranged inside a main microcomputer, the main control diagnosis function 302 and the reserve control diagnosis function 301 are arranged inside a sub microcomputer, and the reserve control function 150 and the regulator 121 for supplying power to each part are arranged inside the motor driving circuit 100. Thus, the reserve control function 150 and the regulator 121 are installed in each of the motor driving circuits 100-1 to 100-3.

FIG. 17 is a view showing a circuit example of the reserve control function 150. Coefficient units 151 to 154 and adders 155-1 to 155-3 perform coordinate transformation to transform signals proportional to the sine (sin θ) and cosine (cos θ) of the magnetic pole position θ outputted from the resolver (not shown), into UVW components. Arithmetic functions 156-1 to 156-3 digitize (make trivalent) each component, using a digitizer 159. A PWM (pulse width modulation) modulator 158 outputs PWMτ of duty proportional to a torque input τ. A multiplier 157 multiplies the PWMτ by the output of the digitizer 159 and thus obtains a PWM signal of each of the U, V and W phases.

In FIG. 17, the coefficient of 1.0 inputted to the adder 155-1 can be realized by directly connecting the signal line, and the coefficient of 0.0 can be realized by not connecting the signal line and therefore is indicated by a dashed line. The coefficient units 151 to 154 can be realized by resistors.

FIG. 18 is a view showing a circuit example in which the sawtooth wave oscillator 1214 and the comparator 1215 are also used as the PWM modulator 158, in the regulator 121. When the regulator 121 operates as a switching regulator, the sawtooth wave oscillator 1214 and the comparator 1215 are needed. However, these are not needed when the regulator 121 operates as a linear regulator. Therefore, by switching whether to use sawtooth wave oscillator 1214 and the comparator 1215 or not according to the operation mode, these circuit sections can be also used as the PWM modulator 158.

FIG. 19 is a table showing the correspondence between the operation mode of the regulator 121, the connecting relation between the respective electrical components, and the circuit function provided by the regulator 121. When in the modes B and C, by switching the points to which the switches 1218 and 1219 are connected respectively as shown in FIG. 19, the sawtooth wave oscillator 1214 and the comparator 1215 can also be used as the PWM modulator 158.

Embodiment 7

In Embodiment 7 of the invention, a configuration in which the regulators 121 are made redundant will be described, in addition to the configuration of the motor driving system and the electric power steering system described in Embodiment 6.

FIG. 20 is a view showing the circuit configuration of other parts than the power source section in the motor driving system and the electric power steering system according to this Embodiment 7. In addition to the circuit configuration described with reference to FIG. 14, the reserve control function 150 is installed for each phase.

FIG. 21 is a view showing the circuit configuration of the power source section in the motor driving system and the electric power steering system according to this Embodiment 7. In this Embodiment 7, each motor driving circuit 100 has two regulators 121 and 121'. Thus, the regulator function is made redundant in each motor driving circuit 100.

FIG. 22 is a table showing the mode setting in each motor driving circuit 100 shown in FIG. 21. For comparison, general circuit specifications are shown as well. As shown in FIG. 22, the regulator 121 operates as the 5 V switching regulator 121-1 when in the mode A, and operates as the 5 V linear regulators 121-2 and 121-3 when in the modes B and C. When in the modes B and C, where switching operation is not performed, the PWM modulators 158-2 and 158-3 are used to convert the torque signal τ to PWMτ.

Similarly, the regulator 121' operates as 3.3 V linear regulators 121'-1 and 121'-2 when in the modes A and B, and operates as a sensor power source 121'-3 when in the mode C. The 5 V switching regulator 121-1 and the 5 V linear regulators 121-2 and 121-3 are OR-connected externally by a diode, as shown in FIG. 21. When the 5V switching regulator 121-1 fails, the 5 V linear regulators 121-2 and 121-3 replace its function. The 3.3 V linear regulators 121'-1 and 121'-2, too, are OR-connected externally by a diode. When one of the 3.3 V linear regulators 121'-1 and 121'-2 fails, the other replaces its function.

Also, as the SEPP output 125 is made to operate as a sensor power source 125-2 when in the mode B and OR-connected externally to the output of the sensor power source 121'-3 by a diode, when one of them fails, the other can replace its function.

When in the modes A and C, where the SEPP output 125 is used as a resolver magnetic excitation signal output, it is desirable that current driving is set by the mode setting. When in the mode B, where the SEPP output 125 is made to operate as a sensor power source, it is desirable that voltage driving is set by the mode setting.

FIG. 23 is a view showing the operation in the case where the motor driving circuit 100-1 has failed. If the 5 V switching regulator 121-1 arranged inside the motor driving circuit 100-1 has failed, the 5 V linear regulators 121-2 and 121-3 replace its function and continue the operation. If the 3.3 V linear regulator 121'-1 has failed, the 3.3 V linear regulator 121'-2 replaces its function and continues the operation. If the power-on reset 122-1 has failed, the 5 V-type voltage drop reset 122-2 replaces its function and continues the operation. If the WDT 1228-1 has failed, the WDTs 1228-2 and 1228-3 replace its function and continue the operation. If the pre-driver U (110-1), the relay driver U, the charge pump for the pre-driver U, the pre-driver U input selector 113-1, and the reserve control function U (150-1) have failed, three-phase driving is stopped and the operation is continued by two-phase driving of the V and W phases. If the switching regulator PWM modulator 158-1 has failed, the 5 V linear regulators 121-2 and 121-3 replace its function and continue the operation, as in the case where the 5 V switching regulator 121-1 has failed. If the resolver Sin signal 123-1 has failed, the operation is continued by estimating and controlling the magnetic pole position with a motor electromotive force. If the resolver magnetic excitation signal+ (125-1) has failed, the resolver is magnetically excited only by the resolver magnetic excitation signal− (125-3) and the operation is continued. However, in this case, the magnetic excitation signal amplitude is half that of normal time.

FIG. 24 is a view showing the operation in the case where the motor driving circuit 100-2 has failed. FIG. 25 is a view showing the operation in the case where the motor driving circuit 100-3 has failed. The operations at the time of failure can be continued roughly on the basis of similar ideas to FIG. 23. If the 5 V linear regulator 121-2 or 121-3 has failed, the operation is continued by the 5 V switching regulator 121-1. The SEPP output 125 is responsible for the function of the sensor power source 125-2, and if this function has failed, the sensor power source 121'-3 replaces the function and continues the operation. If the 3.3 V-type voltage drop reset 122-3 or the total current detection function 123-3 has failed, the operation is continued in the state where these functions are lost.

As described above in Embodiments 5 to 7, with the motor driving system and the electric power steering system according to the invention, the system operation can be continued even if one of the motor driving circuits 100-1 to 100-3 fails.

Embodiment 8

In the above Embodiments 5 to 7, the electric power steering system using the motor driving system is described. However, the invention can be applied to the whole range of brushless motor driving circuits which need to continue operating when a failure occurs. For example, application to an electric brake system or a vehicle driving system can be considered.

FIG. 26 is a circuit diagram of an electric brake system according to Embodiment 8 of the invention. The electric brake system shown in FIG. 26 has the motor driving system described in Embodiments 5 to 7, thereby driving the motor 4 and causing a braking mechanism 22 to operate. Thus, an electric brake function can be provided.

FIG. 27 is a circuit diagram of a vehicle driving system according to Embodiment 8 of the invention. The vehicle driving system shown in FIG. 27 has the motor driving system described in Embodiments 5 to 7, thereby driving the motor 4 and causing a rotating mechanism 23 to operate. Thus, the wheels of the vehicle can be rotated.

As shown in FIG. 28, the electrical circuit may include at least one of the voltage-dividing resistor 9327, an electrical switch 9328 for switching the connection between the electrical components, a signal input unit 9329 which receives a signal inputted from outside the electrical circuit, and the oscillation circuit 9330.

The invention is not limited to the above embodiments and includes various modification examples. The above embodiments are described in detail in order to explain the invention intelligibly, and the invention is not necessarily limited to having all the described configurations. Also, a part of the configuration of an embodiment can be replaced by the configuration of another embodiment. Moreover, the configuration of an embodiment can be added to the configuration of another embodiment. Also, with respect to a part of the configuration of each embodiment, addition of another configuration, deletion, and replacement can be made.

The above configurations, functions, processing units, processing measures and the like may be partly or entirely realized in the form of hardware, for example, by designing on an integrated circuit. Also, the above configurations, functions and the like may be realized in the form of software by a processor interpreting and executing a program that realizes each function. Information of programs, tables, files and the like to realize each function can be stored in a recording device such as a memory, hard disk or SSD (solid state drive), or a recording medium such as an IC card, SD card or DVD.

REFERENCE SIGNS LIST

100: motor driving circuit, 110: pre-driver, 120: electrical circuit, 121: regulator, 122: reset circuit, 123: differential input circuit, 124: hold circuit, 125: SEPP circuit output, 150: reserve control function

The invention claimed is:

1. A motor driving circuit for driving a motor comprising:
a first driver circuit for driving a driver circuit which supplies a drive current corresponding to one phase of a multiphase motor having three or more phases, to the multiphase motor; and
electrical circuits which includes a plurality of electrical components and switches a connecting relation between the electrical components according to an operation mode designated from outside the motor driving circuit, the electrical circuits providing a circuit function corresponding to the operation mode, wherein
the electrical circuits
includes an oscillation circuit which outputs an oscillation signal, a voltage-dividing resistor configured to switch a voltage division ratio, an arithmetic unit which compares a voltage divided by the voltage-dividing resistor with a predetermined reference voltage, a comparison circuit which compares a result of the comparison by the arithmetic unit with the output from the oscillation circuit, and a switching element which turns ON/OFF according to an output from the comparison circuit, and
switches whether to use the output from the oscillation circuit or not, according to the operation mode, and provides at least one of a switching regulator function and a linear regulator function as the circuit function corresponding to the operation mode, wherein
the motor driving circuit supplies a drive current corresponding to each phase of the multiphase motor, to the multiphase motor, and
at least one circuit functions provided by the electrical circuits provided in one of the motor driving circuits is configured to be different from a circuit function provided by the electrical circuits provided in another of the motor driving circuit.

2. The motor driving circuit according to claim 1, wherein the electrical circuits
switch the voltage division ratio according to the operation mode and provides different output voltages from each other as the circuit function corresponding to the operation mode.

3. The motor driving circuit according to claim 1, wherein the electrical circuits
include a capacitor charged with a voltage divided by the voltage-dividing resistor, a switch which turns ON/OFF a connection between the voltage-dividing resistor and the capacitor, a comparison circuit which compares the voltage divided by the voltage-dividing resistor with a predetermined reference voltage, and a switching element which turns ON/OFF and outputs a reset signal according to an output from the comparison circuit, and
switches the turning ON/OFF of the switch according to the operation mode and provides a plurality of types of reset circuit functions with different times for which the switching element continues to output the reset signal, as the circuit function corresponding to the operation mode.

4. The motor driving circuit according to claim 3, wherein the electrical circuits
switch the voltage division ratio according to the operation mode and provides a plurality of types of reset circuit functions with different detection threshold values that serve as a trigger for outputting the reset signal, as the circuit function corresponding to the operation mode.

5. The motor driving circuit according to claim 3, wherein the electrical circuits
include a watchdog timer which checks the presence or absence of a signal input in a predetermined cycle, an OR circuit which OR-connects an output of the comparison circuit and an output of the watchdog timer, and a switching element which turns ON/OFF according to an output from the OR circuit.

6. The motor driving circuit according to claim 1, wherein the electrical circuits
include a differential amplifier circuit and a hold circuit which holds an output from the differential amplifier circuit,
the hold circuit
includes a first switch which turns ON/OFF according to a sampling trigger signal, a second switch which turns ON/OFF according to a reset signal and is connected in parallel to the first switch, a capacitor charged with an output from the first switch or the second switch, and a third switch connected in parallel to the capacitor, and
switches the turning ON/OFF of each of the first switch, the second switch and the third switch according to the operation mode and provides one of a sample and hold function and a peak hold function as the circuit function corresponding to the operation mode.

7. The motor driving circuit according to claim 6, wherein the differential amplifier circuit
includes a loop circuit which feeds back an output from an amplifier circuit for amplifying a differential input, and a fourth switch which switches whether to cause the loop circuit to operate or not, according to the operation mode, and
the electrical circuits
switch the turning ON/OFF of the fourth switch according to the operation mode and causes a level shift function by the loop circuit to operate as the circuit function corresponding to the operation mode.

8. An electric power steering system comprising:
the motor driving system according to claim 1; and
a motor which is driven by the motor driving system and assists an operation of a steering device.

9. An electric brake system comprising:
the motor driving system according to claim 1; and
a motor which is driven by the motor driving system and actuates an electric brake.

10. A vehicle driving system comprising:
the motor driving system according to claim 1; and
a motor which is driven by the motor driving system and rotates wheels provided on a vehicle.

* * * * *